July 28, 1964  C. D. WARD  3,142,517
DRAWER SUSPENSION MEANS
Filed Sept. 28, 1960  9 Sheets-Sheet 1
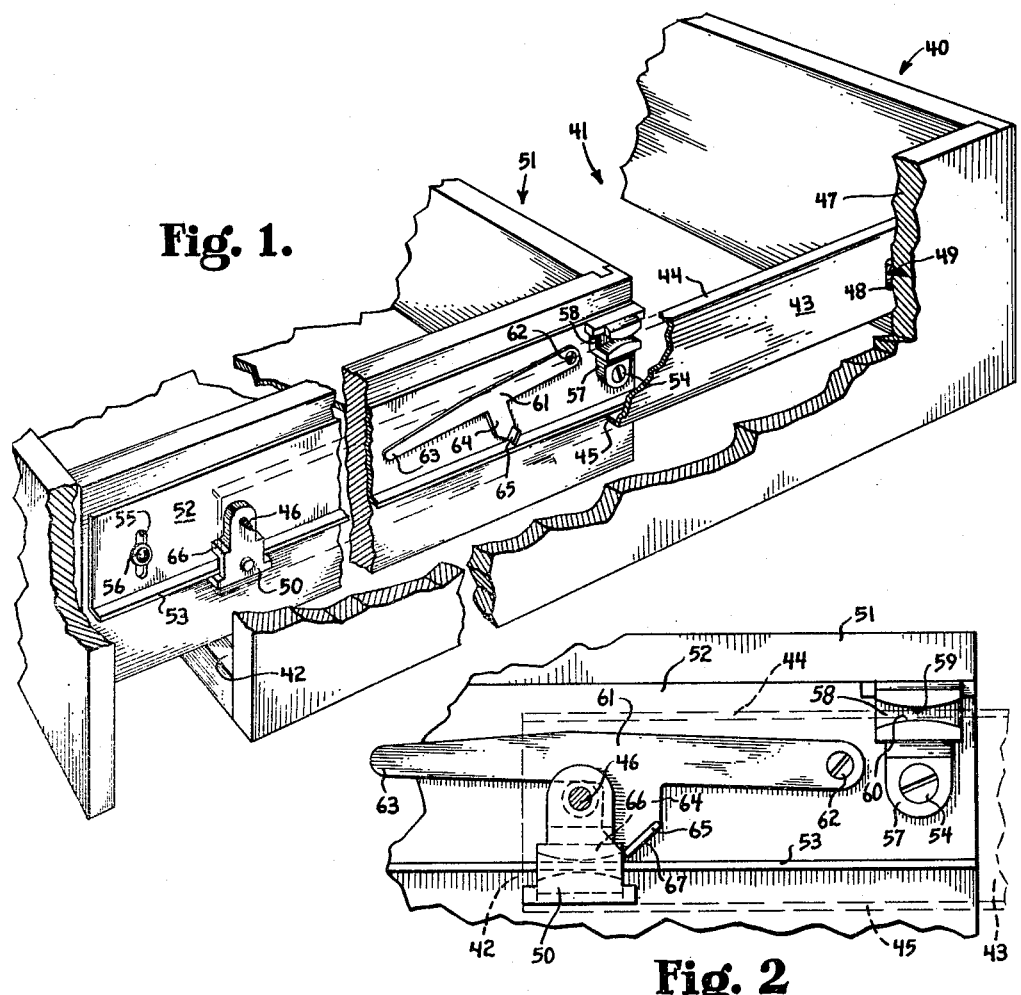
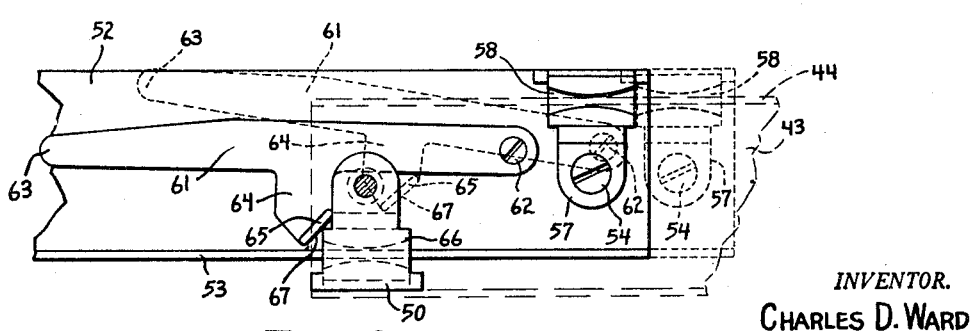
INVENTOR.
CHARLES D. WARD
BY
Harold B. Hood
ATTORNEY

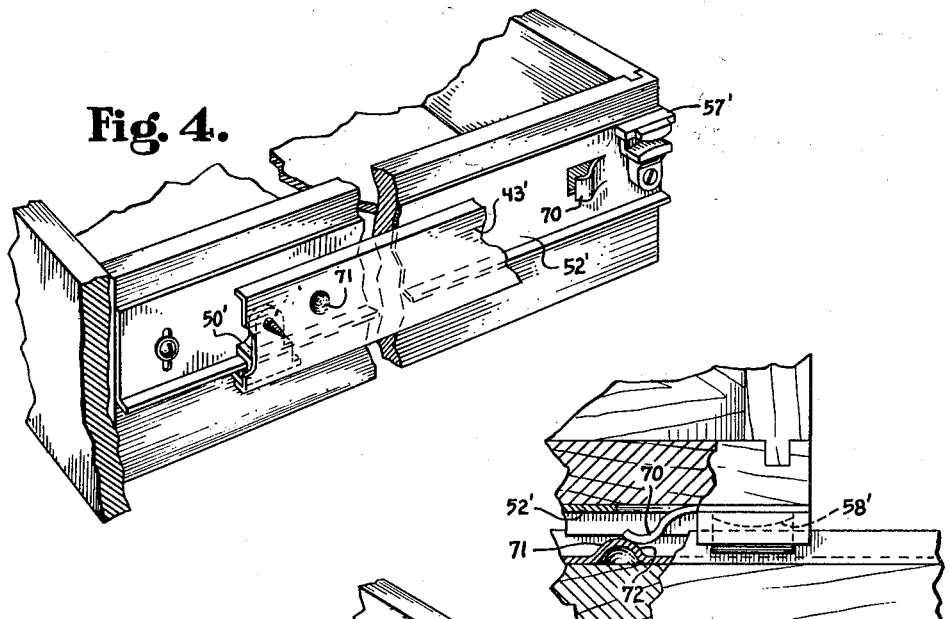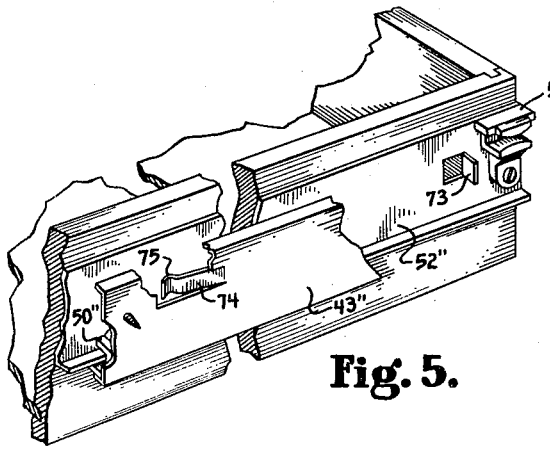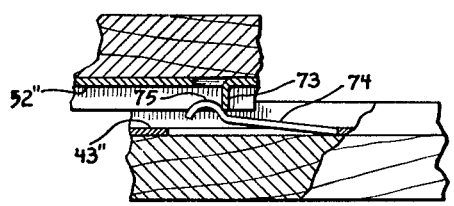

July 28, 1964     C. D. WARD     3,142,517
DRAWER SUSPENSION MEANS
Filed Sept. 28, 1960     9 Sheets-Sheet 3
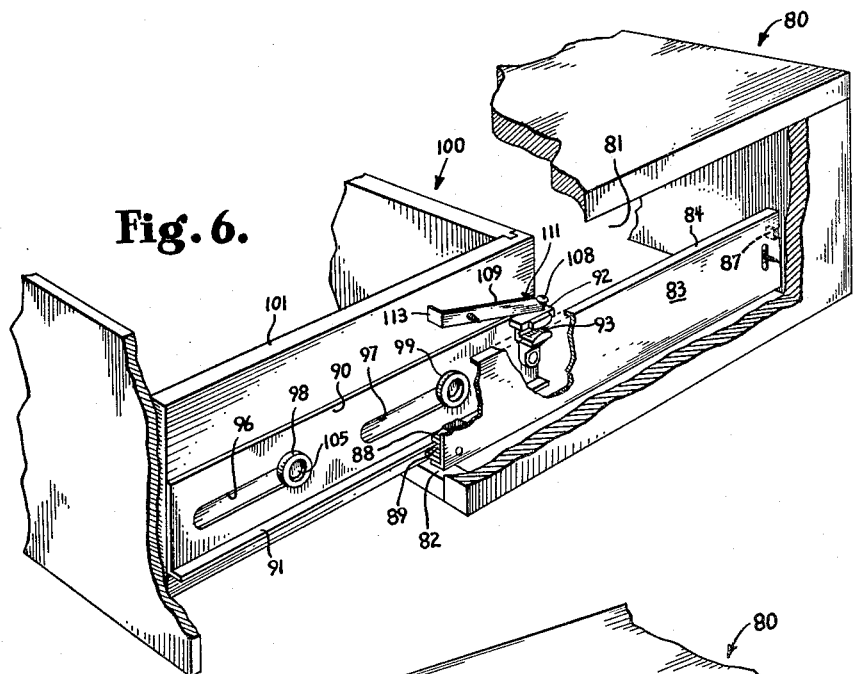
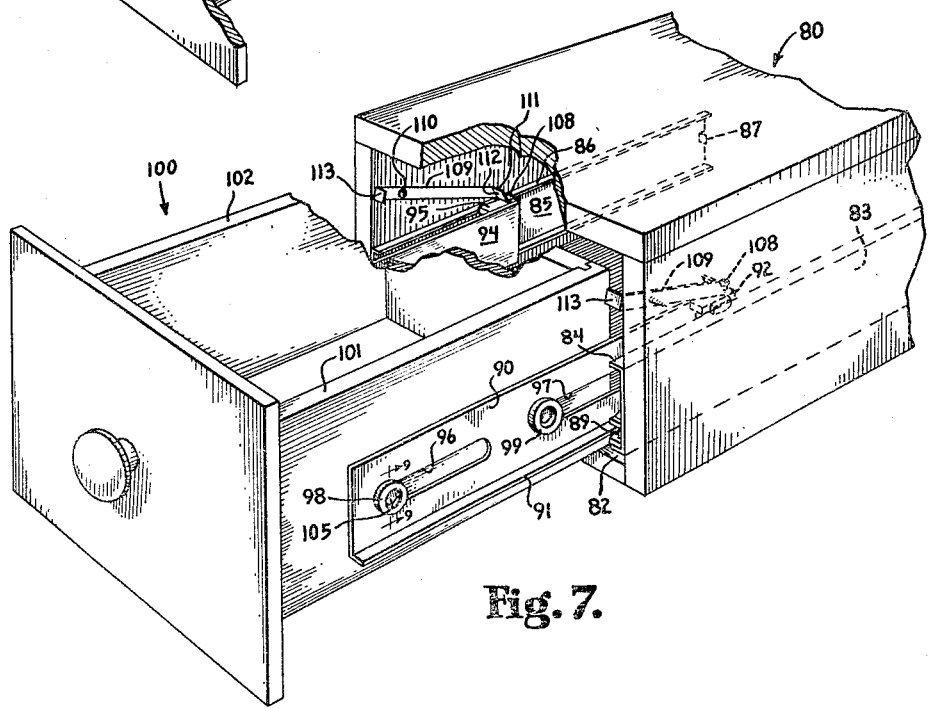
INVENTOR.
CHARLES D. WARD
BY
Harold B. Hood
ATTORNEY

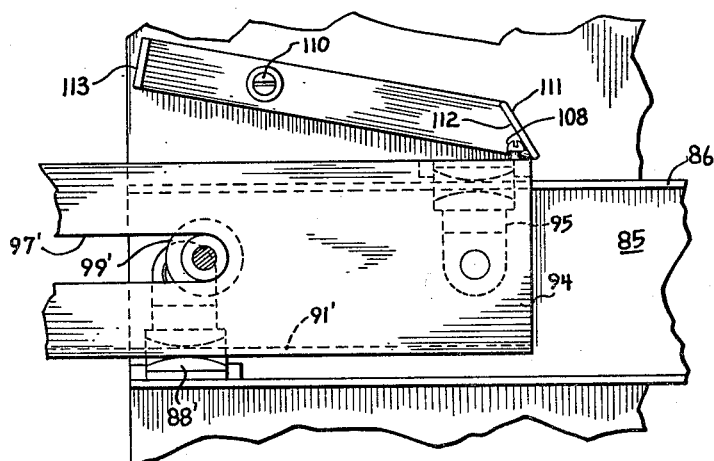
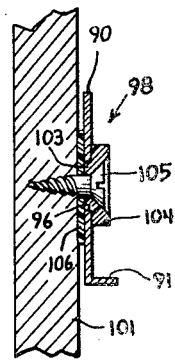
Fig. 8.  Fig. 9.
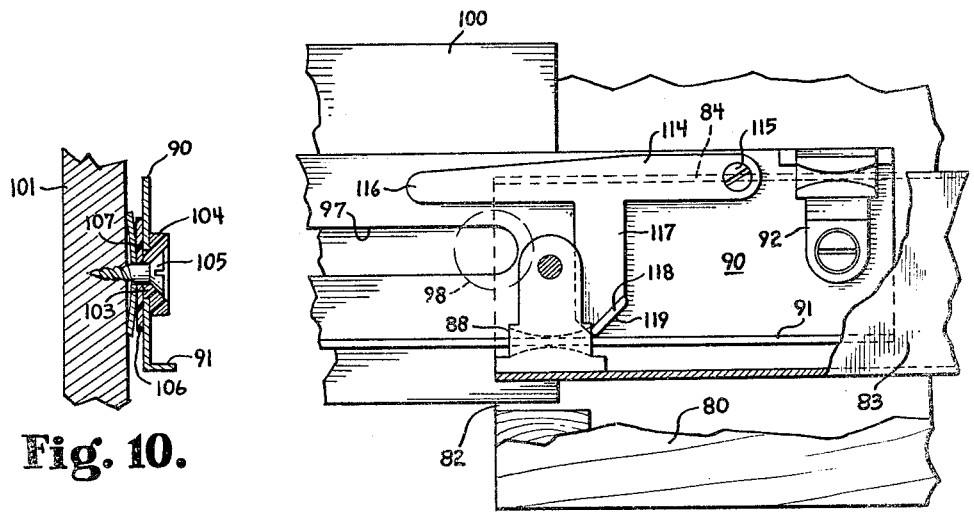
Fig. 10.  Fig. 11.
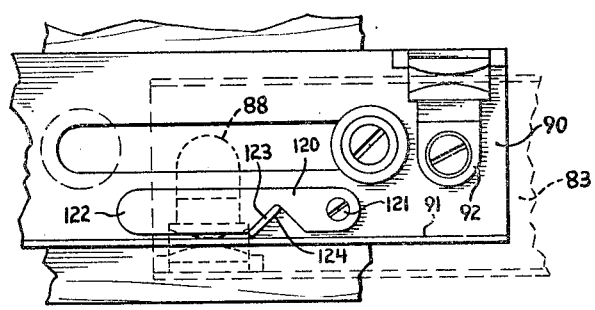
Fig. 12.
INVENTOR.
CHARLES D. WARD
BY
Harold B. Hood
ATTORNEY July 28, 1964
C. D. WARD
3,142,517
DRAWER SUSPENSION MEANS
Filed Sept. 28, 1960
9 Sheets-Sheet 5
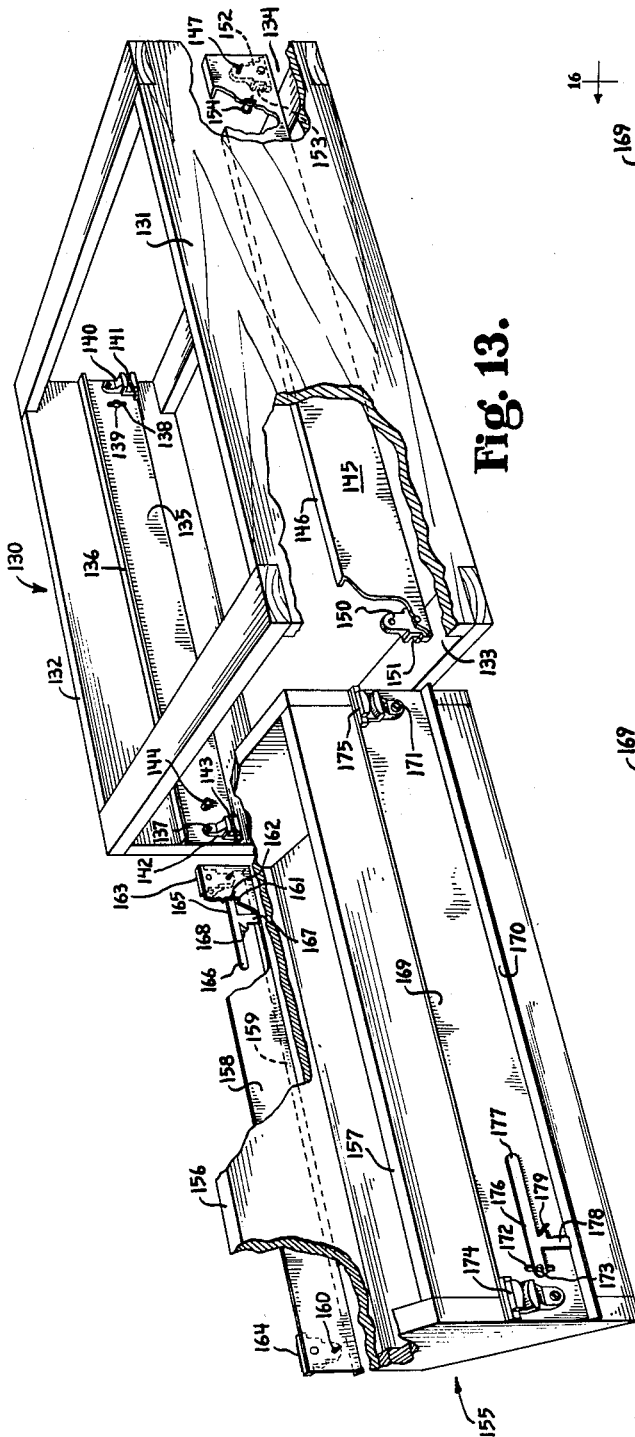
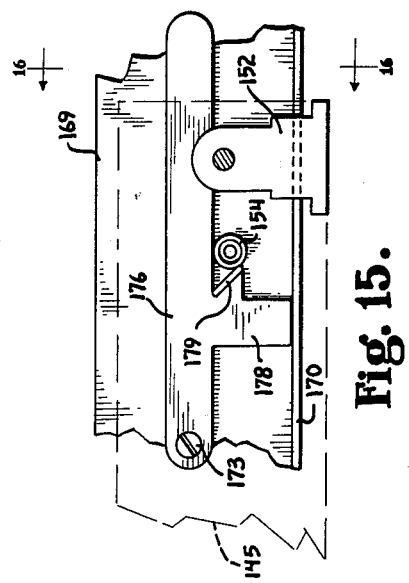
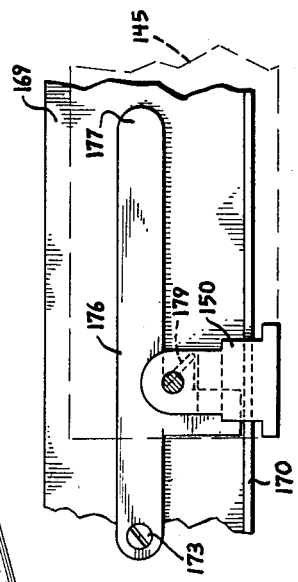
INVENTOR.
CHARLES D. WARD
BY
Harold B. Hood
ATTORNEY

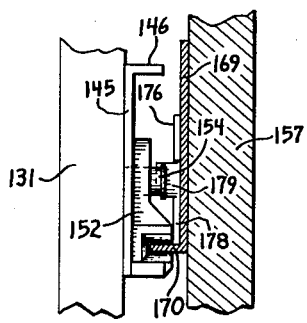
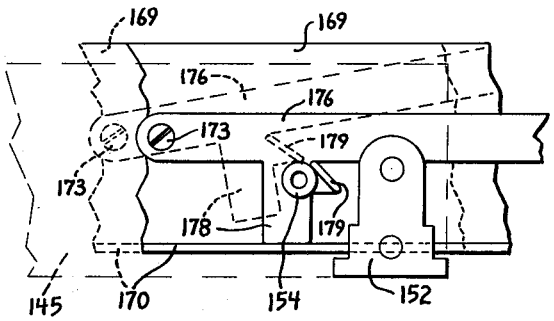
Fig. 16.   Fig. 17.
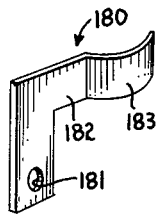 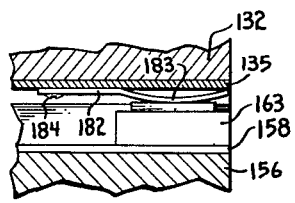 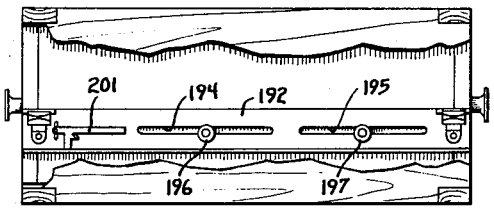
Fig. 17a.   Fig. 17b.   Fig. 18.
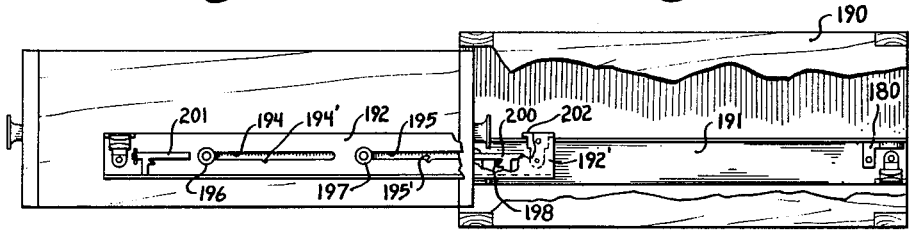
Fig. 19.
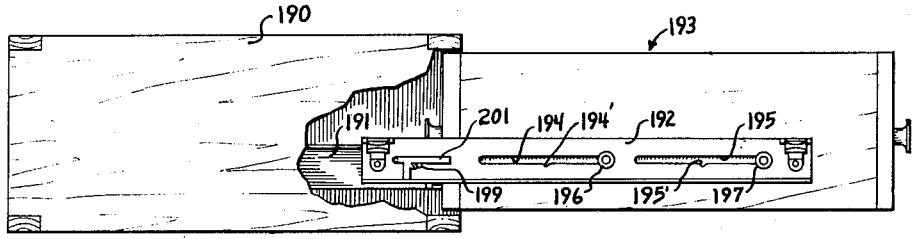
Fig. 20
INVENTOR.
CHARLES D. WARD
BY
Harold B. Hood
ATTORNEY

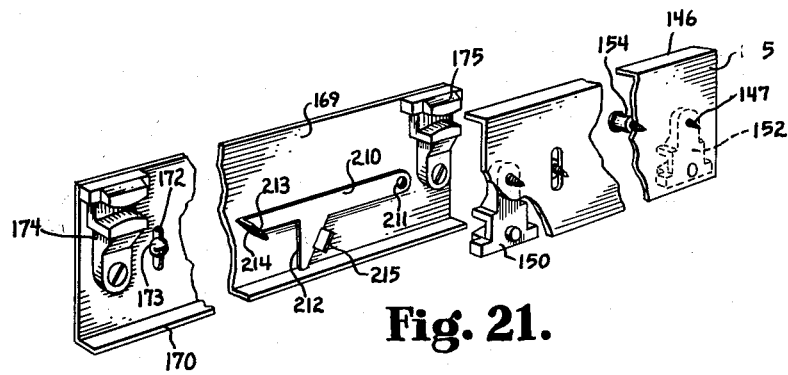
Fig. 21.
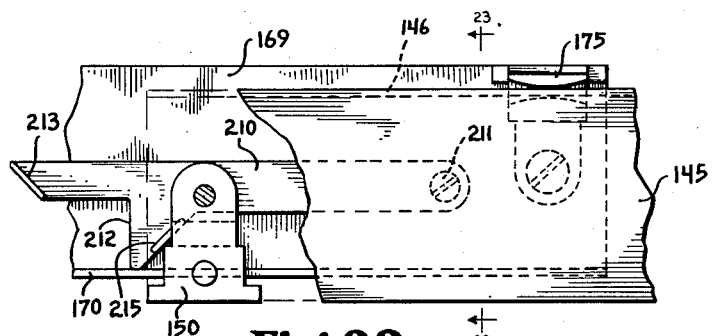 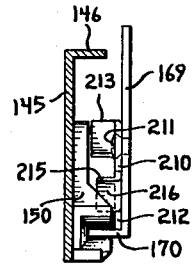
Fig. 22.   Fig. 23.
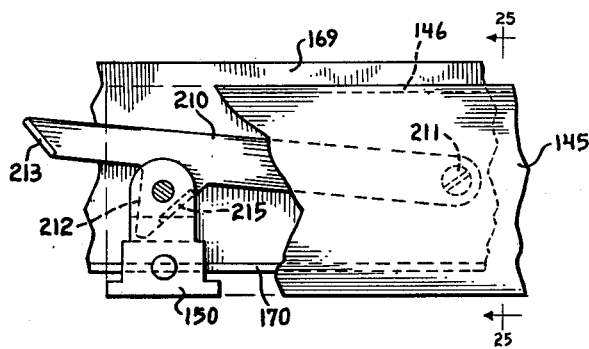 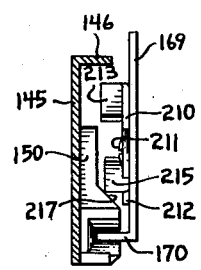
Fig. 24.   Fig. 25.

July 28, 1964 C. D. WARD 3,142,517
DRAWER SUSPENSION MEANS
Filed Sept. 28, 1960 9 Sheets-Sheet 8

INVENTOR.
CHARLES D. WARD
BY Harold B. Hood
ATTORNEY

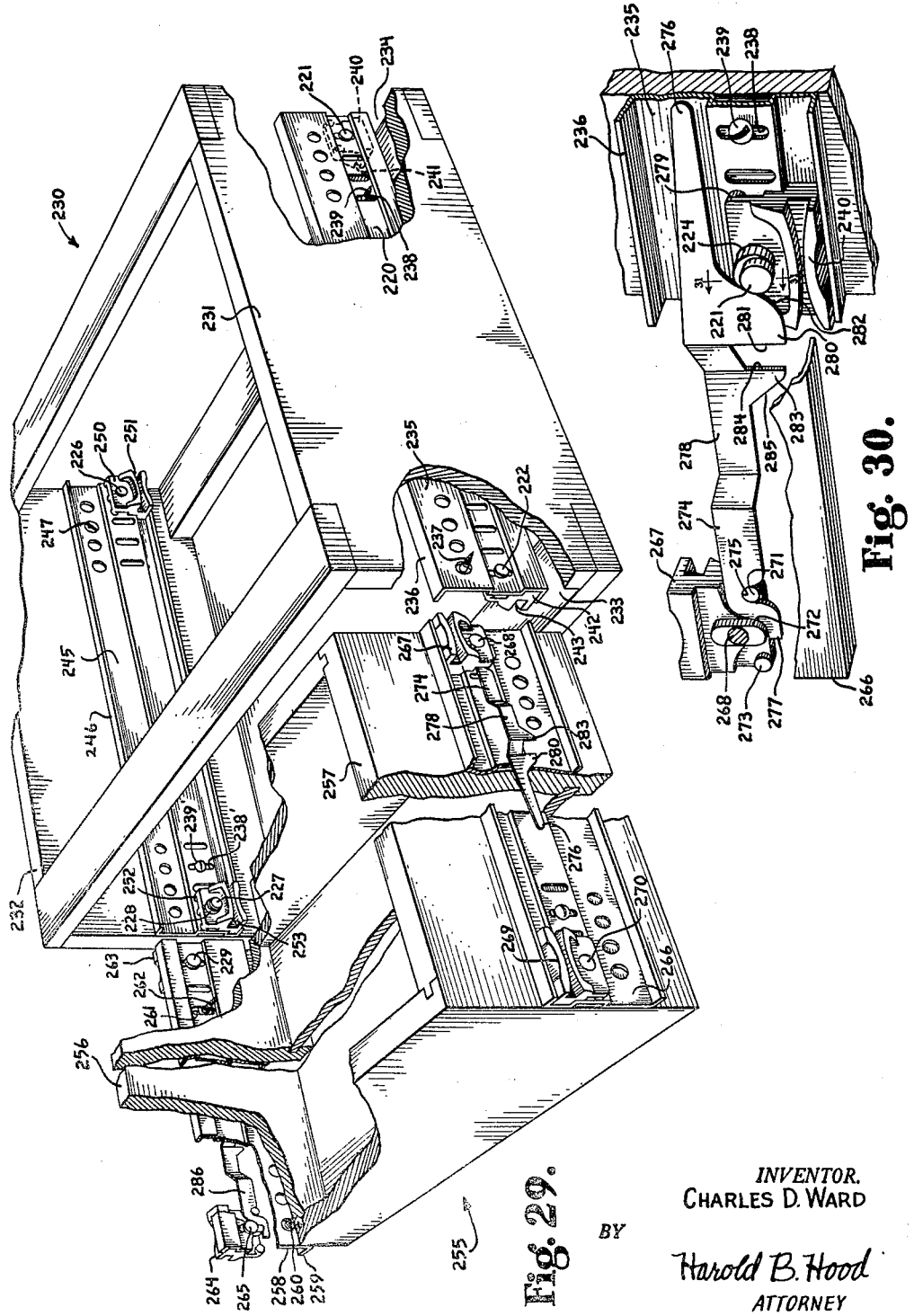

United States Patent Office 3,142,517
Patented July 28, 1964

3,142,517
DRAWER SUSPENSION MEANS
Charles D. Ward, 6255 N. Meridian St.,
Indianapolis, Ind.
Filed Sept. 28, 1960, Ser. No. 58,992
17 Claims. (Cl. 308—3.6)

The present invention relates to drawer suspension means, and its primary object is to provide an improved, yet simplified and very inexpensive, mounting means for a slidable drawer or the like. The invention has been illustrated and will be described in connection with a horizontally-slidable drawer; but it will be appreciated that the principles of the invention to be disclosed are adaptable to use in slide-and-guide suspensions in all sorts of environments.

An object of the invention is to provide, in connection with a slideway and a drawer or the like slidably received therein, guide rails mounted in the slideway, slide rails mounted on the drawer, bearing means of suitable characteristics fixedly mounted in the slideway to receive and support the slide rails and bearing means of similar characteristics to be mounted on the drawer and to receive and be supported by the guide rails. A further object of the invention is to provide, in such an assembly, stop means comprising cooperating elements on the drawer and in the slideway, effective to limit withdrawal of the drawer from its slideway but readily accessible for manipulation, when in limiting position, to release the drawer for complete withdrawal.

A further object of the invention is to provide novel stop means of the character above-suggested.

Still another object of the invention is to provide, in a drawer suspension means, a simplified extension type of suspension wherein the slide rails are mounted for limited longitudinal movement with respect to the drawer so that the drawer may be fully withdrawn from its slideway while yet being suspended and retained in position.

A further object of the invention is to provide improved and simplified suspension means for a two-way drawer which, in an intermediate position, is fully housed within its slideway but is longitudinally movable outwardly in either direction from its slideway. Another object of the invention is to provide, in such an assembly, novel stop means effective to limit the degree of withdrawal of the drawer in either direction and readily accessible for manipulation to release the drawer for complete withdrawal in either direction from its slideway.

Still another object of the invention is to provide novel stop means which, while effective to perform its limiting function as above described, is nevertheless so constructed and arranged that its cooperating elements will automatically pass each other, without manual manipulation, during entry of the drawer into its slideway.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a broken fragmentary perspective view of a drawer and a slideway therefor, illustrating one form of suspension means and stop means;

FIG. 2 is a fragmentary side elevation, drawn to a somewhat enlarged scale, of the drawer, the stop means and portions of the suspension means of FIG. 1, a fragment of the cooperating guide rail being shown in broken lines;

FIG. 3 is a view similar to FIG. 2 but showing the parts in two successive positions which they assume during entry of the drawer into its slideway;

FIG. 4 is a fragmentary perspective view of a suspension means similar to that of FIGS. 1 to 3 but showing a modified form of stop means;

FIG. 4a is a fragmentary section of the stop means of FIG. 4 shown in a different position of adjustment;

FIG. 5 is a view similar to FIG. 4 and showing still another form of stop means;

FIG. 5a is a fragmentary section similar to FIG. 4a but illustrating the stop means of FIG. 5;

FIG. 6 is a fragmentary perspective of a modified form of drawer suspension in which the slide rails are mounted on the drawer for limited longitudinal movement relative thereto;

FIG. 7 is a view similar to FIG. 6 but showing the parts in a different position of adjustment;

FIG. 8 is a fragmentary elevation of the suspension means of FIGS. 6 and 7, drawn to an enlarged scale and showing the parts in a position assumed during entry of the drawer into its slideway;

FIG. 9 is a fragmentary section, taken substantially on the line 9—9 of FIG. 7 and drawn to an enlarged scale;

FIG. 10 is a view similar to FIG. 9 but showing a slightly modified structure;

FIG. 11 is a fragmentary view of a guide rail, a slide rail and the bearing means associated therewith in the form of suspension illustrated in FIGS. 6 and 7 but showing a modified form of stop means;

FIG. 12 is a view similar to FIG. 11 but showing a still further form of stop means;

FIG. 13 is a perspective view of a drawer and slideway therefor in which the drawer is enterable through, and withdrawable from, either end of its slideway;

FIG. 14 is an enlarged fragmentary elevation of the stop means at one corner of the drawer, showing also the stationary bearing means at the corresponding corner of the slideway and illustrating the corresponding guide rail in broken lines;

FIG. 15 is a similar view of the same stop means and its association with the bearing and stop post at the opposite end of the same guide rail;

FIG. 16 is a fragmentary sectional view taken substantially on the line 16—16 of FIG. 15;

FIG. 17 is a view similar to FIG. 15 but showing the parts in two successive positions of adjustment during entry of the drawer into its slideway;

FIG. 17a is an enlarged perspective view of detent means which may be used in any one of the illustrated forms of two-way drawers;

FIG. 17b is a fragmental, horizontal section showing the mode of cooperation of the detent means of FIG. 17a with a drawer bearing;

FIG. 18 is an elevation of a two-way drawer, centered in its slideway, and having slide rails mounted for limited longitudinal movement relative to the drawer, parts of the slideway being broken away for clarity of illustration;

FIG. 19 is a similar elevation showing the drawer fully extended in one direction from its slideway;

FIG. 20 is a similar view showing the drawer fully extended in the opposite direction;

FIG. 21 is a broken perspective view of a guide rail and a cooperating slide rail designed primarily for use in a two-way drawer installation and illustrating a modified form of stop means;

FIG. 22 is an enlarged fragmentary elevation of certain of the parts shown in FIG. 21 in the positions which they will assume at the beginning of entry of the drawer into its slideway from one end thereof;

FIG. 23 is a section taken substantially on the line 23—23 of FIG. 22;

FIG. 24 is a view similar to FIG. 22 but showing the parts in the positions which they will assume as entry of the drawer into its slideway is continued;

FIG. 25 is a section taken substantially on the line 25—25 of FIG. 24;

FIG. 29 is a view similar to FIG. 13 but showing a modified form of stop lever and certain simplifications in the mounting therefor and the arrangement of the associated parts;

FIG. 30 is an enlarged, fragmentary perspective view showing the details of the mounting for the stop lever of FIG. 29.

Figure 26:
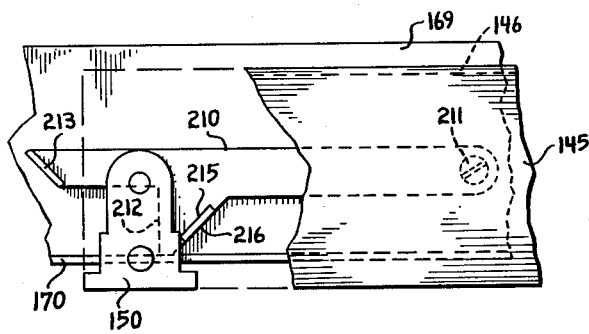
FIG. 26 is a view similar to FIG. 24 but showing the parts in the positions which they will assume after entry of the drawer has been completed and/or as the drawer reaches the limit of its outward movement in one direction in ordinary use.

Referring, now, to the form of invention illustrated in FIGS. 1 to 3, it will be seen that I have shown a frame, indicated generally by the reference numeral 40, formed to provide a slideway 41 having an open mouth 42 at one end thereof. A guide rail 43, having an inwardly-projecting flange 44 at its upper edge and a similar flange 45 at its lower edge, is suitably secured to the internal surface of one side wall 47 of the frame 40; and a similar rail (not shown) is similarly mounted at the opposite side of the slideway so that the flange 44 of the rail 43 and the corresponding flange of the mating rail at the opposite side of the slideway, project toward each other. Preferably, one end of each guide rail is secured to its frame wall by pivotal means such as a screw 46 passing through a suitable perforation in the web of the rail and into the frame wall, while the opposite end of the rail is formed with a substantially vertically extending, elongated slot 48 through which a similar screw 49 projects into the frame wall. It will be obvious that, by loosening the screw 49, the corresponding end of the rail 43 will be freed for limited pivotal adjustment about the axis of the screw 46, and that the rail can be clamped in any selected position of such adjustment by tightening the screw 49. Thereby, I have provided a convenient means for adjusting the guide rails upon initial installation, or during service of the installation to compensate for warpage or damage of any of the parts.

At a point closely adjacent the mouth 42 of the slideway 41, a bearing element 50 is secured to the rail 43 or to the wall 47; and an identical bearing is secured, in allochiral relation, to the opposite wall of the slideway in corresponding adjacency to the slideway mouth. The details of construction of the optimum form of bearing will be described hereinafter. Desirably, the same screw 46 which secures the forward end of the rail 43 to the wall 47 may secure the bearing 50 in place.

A drawer is indicated generally by the reference numeral 51 and carries, on one lateral wall, a slide rail 52 having an out-turned flange 53. A similar slide rail (not shown) is similarly mounted on the opposite side wall of the drawer 51. The rail 52 is secured in place by a screw 54 which, like the screw 46, constitutes a pivotal mounting for one end of the rail 52, and by a screw 56 passing through a vertically elongated slot 55 in the opposite end of the rail. Preferably, the relative positions of the screws 54 and 56 for the slide rails are reversed with respect to the relative positions of the screws 46 and 49 for the guide rails.

A bearing 57 identical with the bearing 50, but positionally inverted with respect to the bearing 50, is secured to each side wall of the drawer closely adjacent the inner end of the drawer.

Each of the bearings 50 and 57 (and their analogues at the opposite side of the slideway) preferably comprises a block of rigid nylon formed with a perforation for the reception of its mounting element and further formed to provide a longitudinally extending slot 58 opening through one laterally-facing surface of the bearing block. In the case of the stationarily mounted bearing 50 and its mate, the slots open toward each other while, in the case of the drawer-mounted bearing 57 and its mate, the slots open outwardly, or away from each other. The bearing 50 is so positioned on the wall 47 that, when the flange 53 of the slide rail 52 is slidably received in its slot, the bearing 57 is so located as to receive the flange 44 of the guide rail 43 in its slot; and the mating bearings at the opposite side of the assembly are similarly arranged with respect to the flanges of their corresponding slide and guide rails. Preferably, the slot 58 of each of the four bearings will be constructed as most clearly illustrated in FIG. 2 so that its bounding walls flare from their mid-points toward their opposite ends; and I presently believe that that flare may be most advantageously provided by forming each wall 59 and 60 upon a convexly circular arc in the manner illustrated. The mid-points of the companion arcuate walls 59 and 60 of each bearing slot are spaced apart by a vertical distance which is substantially equal to the thickness of the rail flange to be slidably received therein, so that the drawer 51 will be snugly suspended without substantial lost motion or play and yet, because of the known characteristics of nylon, the respective flanges will slide freely within their bearing slot supports. The rear or base wall 58' of each bearing slot will also preferably be arcuate, as is most readily to be seen in FIG. 4a. Stated otherwise, it may be said that the slot base wall 58' retreats from the distal edges of the slot walls from its median point toward its opposite ends. Preferably, the lateral depth of each bearing slot, at its midpoint or high point will be substantially equal to the lateral extent of the flange received therein (reduced by the thickness of the associated stop means later to be described) as shown in FIGS. 16, 23 and 25, in order to minimize lateral play of the drawer in its suspension.

The suspension means of the present invention provides for such free, non-binding movement of the drawer with respect to its slideway that it is desirable to provide means acting positively to prevent inadvertent complete withdrawal of the drawer from its slideway. In FIGS. 1 to 3, I have illustrated one satisfactory form of stop means.

A lever 61 is pivotally mounted at one end upon the rail 52 at a point closely adjacent the bearing 57, preferably through the medium of a screw or rivet 62 taking into the rail 52. The distal end 63 of the lever 61 extends toward the front end of the drawer, and the length of the lever 61 is such that, when the drawer reaches its limit of outward movement, said lever end 63 will be disposed outwardly beyond the mouth 42 of the slideway for ready accessibility for manipulation. Intermediate its ends, the lever 61 carries a downwardly extending finger 64 which normally rests and is supported upon the flange 53. An ear 65 is outturned from the finger 64; and the upper portion 66 of the body of the bearing 50, which overlies the flange 53, is disposed in the path of said ear 65 so that, as the drawer 51 approaches complete withdrawal through the mouth 42 of the slideway, the ear 65 will engage said portion 66 of the bearing 50 to block further outward movement of the drawer. Preferably, a similar stop lever (not shown) is similarly mounted on the opposite lateral side of the drawer 51.

As has been stated, when the parts are in the positions illustrated in FIG. 2, the distal end 63 of each lever 61 projects beyond the open mouth 42 of the slideway 41 and is therefore readily accessible for manipulation. If that lever end is lifted, the ear 65 will be raised above the upper surface of the portion 66 of the bearing 50, and thereupon the drawer may be fully withdrawn from its slideway, the bearings 50 and 57 being so proportioned and arranged as to pass freely.

In FIG. 3, I have illustrated the operation of the stop means when the drawer is being entered in its slideway. The rail 53 is brought into registry with the slots of the fixed bearings 50 whereupon the slots of the drawer-carried bearings 57 will register with the flanges 44 of the guide rails. Now, as the rear end of the drawer is moved into the slideway, the ears 65 of the levers 61 will engage the upper portions 66 of the bearings 50. As is most clearly shown in FIGS. 2 and 3, the ears 65 are formed to provide upwardly and rearwardly inclined cam surfaces 67; and as those surfaces engage the bearing portions 66, during inward movement of the drawer, they will lift the distal ends of the levers 61 and will ride over the upper surfaces of the bearing portions 66 in the manner illustrated in broken lines in FIG. 3.

It will be apparent from the above description that the flange 45 of the guide rail 43 is functionless in the assembly of FIGS. 1–3 and that the rail 43 therefore could be, like the rail 52, an angle or L-shaped piece, rather than a channel, as shown. In some forms of the invention illustrated herein, both flanges of a channel may serve a useful function; but where, as in the case of the rail 43, only one flange of such a piece is functional in the organization, the word "channel" as applied thereto in the present specification or in the claims appended hereto, is intended to be construed to include an angle or L-shaped piece.

In FIGS. 4 and 4a, I have illustrated a modified form of stop means which may be substituted for the levers 61 of FIGS. 1 to 3. As shown in FIG. 4, either guide rail 43' or both of them may be formed to provide a substantially hemispherical or conical, inwardly projecting pimple or protrusion 71 providing a camming surface 72; and the corresponding slide rail or rails 52' may be formed with a punched-out tongue 70. The pimple 71 is formed near the bearing 50' at the forward end of the rail 43' and the tongue 70 is formed near the bearing 57' at the rearward end of the rail 52'. As is most clearly shown in FIG. 4a, as the drawer approaches complete withdrawal, the distal end of the tongue 70 will engage the camming surface 72 to inhibit further withdrawal of the drawer. Upon the exertion of substantial force, however, the tip of the tongue 70 will be caused to ride up the camming surface 72, thus resiliently flexing the tongue 70, until the tongue end can pass the tip of the pimple 71.

Upon reinsertion of the drawer in its slideway, of course, the inclined outer surface of the tongue 70 will come into engagement with the pimple 71 and, as force is applied to the drawer, the tongue will again be flexed to permit it to pass the pimple.

In FIGS. 5 and 5a, I have shown another alternative form of stop means. In those figures, I have shown a guide rail 43" carrying a bearing 50" and a cooperating slide rail 52" carrying a bearing 57". Near the bearing 50", the rail 43" is formed to provide an inwardly and forwardly inclined tongue 74 formed with a part-cylindrical surface 75 at its distal end. A tongue 73 is turned outwardly at approximately 90° from the body of the rail 52" near the bearing 57". As the drawer approaches complete withdrawal from its slideway, the tongue 73 will strike the surface 75 to inhibit further outward movement of the drawer. The application of further force to the drawer, however, will cause the tip of the tongue 73 to ride over the camming cylindrical surface 75, thus resiliently flexing the tongue 74 outwardly to permit passage of the tongue 73. A similar action occurs upon reinsertion of the drawer in its slideway.

In the form of suspension means illustrated in FIGS. 6, 7, 8 and 9, I have shown a frame, indicated generally by the reference numeral 80, formed to provide a slideway 81 having an open mouth 82 at one end for accommodation of a drawer indicated generally by the reference numeral 100. A guide rail 83 having an inwardly extending flange 84 is suitably mounted on one lateral wall of the slideway and a similar rail 85 having a flange 86 is suitably mounted on the opposite lateral wall of the slideway. Stop means, such as the inturned tongue 87, is provided at the rear end of each rail 83 and 85. A bearing 88, having a longitudinal slot 89, is mounted adjacent the forward end of the rail 83 and a similar bearing 88' (FIG. 8) is mounted adjacent the forward end of the rail 85 in complete analogy to the bearings 50 of the form of invention illustrated in FIGS. 1 to 3.

A slide rail 90 having an outturned flange 91 is mounted upon one lateral wall 101 of the drawer 100, and said slide rail carries, at its rearward end, a bearing 92 having a longitudinally extending slot 93 formed therein. The slot 89 of the bearing 88 slidably receives the flange 91 of the rail 90 while the slot 93 of the bearing 92 slidably receives the flanges 84 of the rail 83. A similar slide rail 94 is mounted on the wall 102 and carries a similar bearing 95 in which the flange 86 is slidably received, the bearing 88' receiving a flange 91' of the rail 94.

The rails 90 and 94, in this form of the invention, are mounted for limited longitudinal movement relative to the drawer 100. Since the means for so mounting said rails is identical at the opposite sides of the drawer, only one has been illustrated and will be described.

The rail 90 is formed with longitudinally elongated slot means 96, 97, said slot means being penetrated by at least two bearing devices 98, 99. As is most clearly shown in FIG. 9, each such bearing means comprises a perforated nylon element having a stem portion 103 whose vertical dimension is substantially equal to the width of the associated slot means, and a head portion 104 whose vertical dimension exceeds that width. Each stem portion 103 snugly penetrates the associated slot means and has an axial dimension which does not exceed the thickness of the associated slide rail. A screw 105 penetrates each bearing element and enters the associated lateral wall of the drawer. Preferably, a perforated nylon washer 106 is interposed between the slide rail and the drawer wall and is penetrated by the screw 105. It will be clear that the screw 105 may be turned up to press the inner surface of the head 104 of the associated bearing means against its slide rail with any degree of tightness and that the slide rail is thus mounted for sliding movement with respect to its bearing means under any desired degree of friction. Since the surfaces of the element 98 and the element 106 which bear upon the slide rail are nylon surfaces, no problems of lubrication need be met.

In FIG. 10, I have illustrated a modified form of support in which a spring washer 107, which may be formed of metal, is interposed between the nylon washer 106 and the wall 101 of the drawer. In certain installations, the inclusion of such a spring washer may be desirable to compensate for improper dimensioning of the drawer and its slideway, to overcome the effects of possible warpage or merely to provide for greater flexibility in adjustment of the frictional engagement between the slide rail and its bearing means.

In this form of the invention, I have shown still another form of stop means. Thus, each bearing 92 and 95 is provided with an abutment element 108 projecting upwardly from its upper end; and a lever 109 is pivotally mounted, intermediate its ends, adjacent the forward end of each lateral wall of the frame 80. Each such lever is formed at its rearward end with an inturned toe 111 having a forwardly and upwardly inclined abutment surface 112; and at its forward end, each such lever is preferably provided with an inturned ear 113 which is disposed closely adjacent the open mouth 82 of the slideway 81.

Normally, the rails 90 and 94 will lie in their forwardmost positions with respect to the drawer 100, as suggested in FIG. 6. As the drawer is pulled outwardly in its slideway, the rails will move with the drawer walls 101 and 102 until the stop members 108 strike the toes 111, whereby further outward movement of the rails will be arrested. The drawer, however, can be moved to the position of FIG. 7, the bearings 98 and 99 sliding in the slot means 96 and 97 until said bearings reach the outermost ends of said slot means. The parts are so proportioned and designed that, in the position of FIG. 7, the drawer will be positioned wholly outside the slideway 81, but will still be effectively supported upon the rails 90 and 94 which, in turn, are effectively supported by the bearings 88 and 92 and the bearings 88' and 95. It will be perceived that the provision of the sliding relationship between the drawer walls and the slide rails permits such full withdrawal of the drawer while maintaining a substantial longitudinal separation between the bearings 88 and 92 and the bearings 88' and 95, whereby the effective lever arm between the bearings on each side of the drawer is sufficient to provide ample support for the drawer.

In the position of FIG. 7, of course, the ears 113 are readily accessible for manipulation to lift the toes 111 out of obstructing relation with the stop elements 108, to permit complete withdrawal of the drawer assembly from the slideway.

In FIG. 8, I have shown the parts in the positions which they assume during reinsertion of the drawer assembly into the slideway. It will be readily apparent that, as further forces exerted upon the drawer assembly to move it toward the right, the abutment members 108 will act upon the inclined surfaces 112 to cam the toes 111 freely upwardly to permit the stop elements to pass the toes 111.

In FIG. 11, I have shown stop means closely comparable to that of FIGS. 1 to 3 incorporated in the type of suspension means illustrated in FIGS. 6 to 8. As there illustrated, the stop elements 108 and the levers 109 are replaced by a lever 114 carried on one or both of the slide rails 90 and 94. As shown, the lever 114 is pivotally mounted at one end upon a screw 115 taking into the rail 90 closely adjacent the bearing 92. The distal end 116 of the lever 114 projects forwardly from the pivot 115, and a finger 117 depends from the lever 114, intermediate the ends thereof, and normally rests upon the flange 91. When the finger so rests upon the flange, the upper portion of the bearing 88 is disposed in the path of an out-turned toe 118 at the lower end of the finger; and the parts are so proportioned and designed that, when the toe 118 is in stopping engagement with the bearing 88, the distal end 116 of the lever 114 will project beyond the open mouth 82 of the slideway 81 to be readily accessible for manipulation. Obviously, if the lever end 116 is lifted, the toe 118 will be elevated to clear the upper portion of the bearing 88 and permit free and complete withdrawal of the drawer assembly. The toe 118 is formed to provide an upwardly and rearwardly inclined cam surface 119 which cooperates with the upper portion of the bearing 88, upon reinsertion of the drawer assembly, to cam the lever 114 upwardly to clear the bearing portion automatically.

In FIG. 12, I have shown still another form of stop means associated with the slide rail 90. In this form, the lever 120 is a simple strap pivoted, at its rearward end, upon a screw 121 which takes into the rail 90 near the bearing 92 and near the lower edge of the rail. The distal end of the lever projects forwardly from the screw 121; and a toe 123 is punched and turned outwardly from the body of the lever so that the lower edge of the toe is disposed slightly below the bottom edge of the strap 120. That lower edge of the toe rests normally upon the flange 91 so that the toe will engage the bearing 88 to stop outward movement of the rail 90. The parts are so proportioned and designed that, when the toe 123 is engaged with the bearing, the distal end 122 of the lever is disposed outwardly beyond the open mouth 82 of the slideway 81 where it is readily accessible for manipulation to lift the toe 123 to clear the bearing and permit full withdrawal of the drawer assembly. The toe 123 is formed with an upwardly and rearwardly inclined cam surface 124 which will automatically swing the lever 120 upwardly upon insertion of the drawer into its slideway.

In FIGS. 13 through 17, I have shown still another form of drawer suspension means embodying the present invention. In this case, a frame 130 is formed to provide a slideway bounded by lateral walls 131 and 132 and open at both ends to define a forward mouth 133 and a rearward mouth 134. Such an arrangement finds its primary utility where the frame is mounted in a wall or divider between, for instance, a kitchen and a dining room and it is desirable that the drawer may be opened into either room.

A slide rail 135 having an inturned flange 136 is secured to the wall 132 by means, for instance, of a screw 137 at one end of the rail and a screw 139 passing through a vertically elongated slot 138 adjacent the opposite end of the rail. A bearing 140, similar in all respects to the bearing 50, and having a longitudinally extending slot 141 therein is secured to the rail adjacent the mouth 134; and a similar bearing 142 having a longitudinally extending slot 143 is secured to the rail, preferably by means of the screw 137, closely adjacent the mouth 133. The slots 141 and 143 are disposed substantially in a common plane. Near the bearing 142 there is mounted an inwardly projecting stop post 144, said post being somewhat rearwardly spaced from the bearing 142.

An identical slide rail 145 having an inwardly projecting flange 146 is similarly mounted upon the frame wall 131 preferably by means of a screw 147 taking into the wall 131 near the mouth 134 and another screw (not shown) passing through a vertically elongated slot (not shown) near the forward end of the rail. A bearing 150 formed with a longitudinally extending slot 151 is secured to the rail 145 adjacent the mouth 133 and a similar bearing 152 formed to provide a similar slot 153 is secured to the rail 145, preferably by means of the screw 147, closely adjacent the mouth 134. The slots 151 and 153 will be disposed in a common plane. Near the bearing 152 there is mounted an inwardly projecting stop post 154, said post being spaced forwardly from the bearing 152 by a distance equal to the spacing between the bearing 142 and the post 144.

A drawer indicated generally by the reference numeral 155 is proportioned and designed for slidable reception in the frame 130 and includes side walls 156 and 157. A slide rail 158 having an outwardly extending flange 159 is secured to the outer surface of the wall 156 by means, for instance, of a screw 160 penetrating the rail near its forward end and taking into the wall 156 and a screw 162 passing through a vertically elongated slot 161 in the rail 158 near its rearward end and taking into the wall 156. A bearing 163 which may be identical with the bearing 50 is secured to the rail 158 adjacent its rearward end and is formed with a slot adapted slidably to receive and be supported upon the flange 136 of the rail 135. A similar bearing 164 is secured to the rail 158, preferably by means of the screw 160, adjacent the forward end of said rail; and said bearing 164 is likewise formed with a slot adapted to receive and be supported upon the flange 136. A stop lever 165 is pivotally supported, at its rearward end, upon the screw 162 with its distal end 166 projecting forwardly therefrom. Intermediate its ends, the lever 165 carries a depending finger 167 which normally rests upon the flange 159; and said finger carries an outturned toe 168 which, when the finger 167 rests upon the flange 159, is disposed at the level of the stop post 144. As is clearly illustrated, the toe 168 is upwardly and rearwardly inclined so that, when the toe 168 engages the stop post 144 during rearward movement of the drawer, the toe will be freely cammed up and over the stop post 144.

An identical slide rail 169 is suitably mounted upon the external surface of the drawer wall 157, preferably by means of a screw 171 penetrating the slide near its rearward end and taking into the wall 157 and a screw 173 passing through a vertically elongated slot 172 near the forward end of the rail. A bearing 174 is suitably mounted on the rail 169 at its forward end and an identical bearing 175 is mounted on the rail 169 at its rearward end, preferably by means of the screw 171.

A stop lever 176 identical with the lever 165 is pivotally mounted at its forward end and near the forward end of the rail 169, preferably upon the screw 173, with its distal end 177 projecting rearwardly. Intermediate its ends, the lever 176 carries a depending finger 178 which normally rests upon the flange 170; and a toe 179 is outturned near the upper end of the finger 178. The toe 179 is upwardly and forwardly inclined and is disposed at the level of the stop post 154.

When the drawer 155 is to be entered in the slideway of the frame 130 from its position illustrated in FIG. 13, the slots in the bearings 163 and 175 are aligned with the flanges 136 and 146 and the flanges 159 and 170 are similarly aligned with the slots in the bearings 142 and 150. Now, as the drawer moves toward the right, the flanges 159 and 170 will be slidably engaged in, and supported by, the slots 143 and 151 of the bearings 142 and 150, and the slots in the bearings 163 and 175 will receive the flanges 136 and 146 slidably to be supported thereby. The toe 168 of the stop lever 165 clears the bearing 142 and its rearwardly facing, upwardly and rearwardly inclined surface engages the stop post 144 and automatically cams its way up and over that stop post. The drawer will now slide freely toward the right until it is fully housed within the slideway with the forward end of the drawer flush with the forward end of the slideway and the rearward end of the drawer flush with the rearward end of the slideway.

If desired, I may provide means for inhibiting inadvertent movement of the drawer from this position; and in FIGS. 17a and 17b I have illustrated one form of such means. A bracket 180 is formed with a perforation 181 for the reception of a screw 184 taking into a suitable perforation in the rail 135. The bracket includes a longitudinally extending arm 182 terminating in an arcuate, resilient portion 183 which resiliently presses against the outer face of the bearing 163 when that bearing is in registry with said bracket 183. Thus, the bracket resilient portion tends frictionally to arrest and hold the drawer in its fully housed position.

As the drawer approaches its fully housed position, the toe 179 of the stop lever 176 must pass the bearing 150; but that toe is disposed above the inwardly projecting portion of the bearing 150 and therefore freely clears the bearing.

If it is desired to move the drawer toward the right beyond its fully housed position, the toe 168 of the stop lever 165 will similarly clear, and freely pass, the bearing 140, and the drawer will slide freely until the toe 179 of the stop lever 176 encounters the stop post 154. The upwardly and forwardly inclined cam surface of the toe 179 engages beneath the post 154 and, since the lever 176 is restrained against clockwise movement about its pivot by the engagement of its finger 178 with the flange 170, the drawer will be stopped when the toe 179 so engages the stop post 154.

In this position of the parts, the distal end 177 of the lever 176 extends beyond the open slideway mouth 134 and therefore is readily accessible for manipulation. If it is desired to withdraw the drawer fully from its slideway, the lever end 177 may be manually lifted to raise the toe 179 above the stop post 154, thus clearing the drawer assembly for complete removal.

When the drawer is reentered in the slideway through the mouth 134, the toe 179 will automatically cam its way past stop post 154, the toe 168 of the lever 165 will clear the bearing 140; and, if the drawer is moved on through the slideway to project forwardly beyond the mouth 133, the toe 179 of the lever 176 will clear the bearing 150 and the drawer will move freely until the upwardly and rearwardly inclined cam surface of the toe 168 encounters the stop post 144. In that position of the parts, the distal end 166 of the lever 165 projects outwardly beyond the mouth 133 of the slideway so that it is readily accessible for manual manipulation. If desired, it may be lifted to raise the toe 168 above the level of the stop post 144, and the drawer assembly may be removed from the mouth 133 of the slideway.

FIG. 14 shows the toe 179 clearing the bearing 150 as the drawer is moved to carry said toe in either direction past that bearing. FIGS. 15 and 16 show the toe 179 engaged with the stop post 154 to limit rearward movement of the drawer. FIG. 17 shows in solid lines the toe 179 as it encounters the stop post 154 during insertion of the drawer through the rearward mouth 134 of the slideway, and, in broken lines, the toe 179 camming its way automatically over and past the stop post 154.

It will be perceived that the rails 135 and 145 and the parts carried thereon are identical and so are interchangeable; and that the rails 158 and 169 and the parts carried thereby are also identical and thus interchangeable. It will further be recognized that the drawer 155 may be reversed, so that the lefthand end of the drawer as shown may be entered through the mouth 133, without in any way modifying the operation of the whole assembly.

A two-way drawer, generally of the character of that just described, may be suspended, like the drawer of FIGS. 6 through 12, for full movement to the outside of the slideway, from either end thereof; and in FIGS. 18 to 20, I have shown such a suspension.

The frame 190, like the frame 130, is formed to provide a slideway open at its opposite ends, with guide rails 191 (only one of which is shown) fixedly mounted at opposite sides of the slideway and conforming in all respects to the guide rails 135 and 145 and their associated parts. Slide rails 192 and 192' are mounted upon the opposite side walls of the drawer 193, through the medium of slots 194 and 195 penetrated by bearings 196 and 197 similar to the bearings 98 and 99 of FIG. 6. In this instance, the longitudinal extent of each slot 194 and 195 is substantially twice as great as the longitudinal extent of the slots 96 and 97 of FIG. 6, and the parts are so proportioned and arranged that, when the drawer assembly is in its median, or fully housed position, the bearings 196 and 197 are disposed at the median points of their respective slots when said bearings drop into shallow notches 194' and 195'. One guide rail 191 is provided with a stop post 198 similar to the post 144 near the forward mouth of the slideway and the other guide rail is provided with a similar stop post 199 (FIG. 20) near the rearward mouth of the slideway. (It will be understood that the stop post shown in FIG. 20 actually is carried by that guide rail which is supported from that portion of the side wall of the frame 190 which is broken away in the figure.) A stop lever 200, like the stop lever 165, cooperates similarly with the post 198 while a stop lever 201, like the stop lever 176, cooperates similarly with the stop post 199.

It will be obvious that, as the drawer 193 is moved from its position illustrated in FIG. 18 toward the left, the slide rails 192 and 192' will travel with the drawer until the lever 200 meets the stop post 198 to arrest movement of the slide rail 192'. Further movement of the drawer to the left will cause the bearings 196 and 197 to leave the notches 194' and 195' and to slide in their slots 194 and 195 until the parts reach their positions illustrated in FIG. 19, where the drawer will be retained against further outward movement. In this position, the distal end of the lever 200 is exposed for accessible manipulation to release the engagement of said lever with the post 198 and to permit complete withdrawal of the drawer assembly from the slideway.

As the drawer is returned toward the position of FIG. 18, the bearings 196 and 197 will usually slide relative to the rails 192 and 192' until they drop into the notches 194' and 195', whereafter the rails will be entrained with drawer movement until the bearing 202 at the rear end of the rail 192' meets the arresting device 180, one of which is mounted at each corner of the slideway. At this time, the drawer is in the completely housing condition of FIG. 18.

The action of the parts is analogous when the drawer is moved to the right from the position of FIG. 18 to the position of FIG. 20.

Still another form of stop means is illustrated in FIGS. 21 to 28. In those figures, the stop means is shown in connection with an assembly like that of FIGS. 13 to 17, but as the description proceeds it will become apparent that the stop means of FIGS. 21 to 28 may be used with any one of the drawer assemblies heretofore described.

FIG. 21 illustrates the guide rail 145 of FIG. 13, with its mid-portion broken away, and the slide rail 169 of FIG. 13, with its mid-portion broken away. The bearings 150 and 152, the screw 147 and the post 154 are shown in assembled relation with the rail 145 and the bearings 174 and 175 and the screw 173 are shown in assembled relation with the slide rail 169. In place of the stop lever 176 at the forward end of the rail 169, however, I have shown a different form of stop lever 210 at the rearward end of the rail; and it will be understood that a lever similar to the lever 210 will be correspondingly mounted at the forward end of the slide rail 158.

The lever 210 is pivotally supported at its rearward end upon, for instance, a screw 211 taking into the rail 169, with the distal end of the lever projecting forwardly therefrom. Intermediate its ends, the lever 210 carries a depending finger 212 which is supported upon the flange 170. At its distal end, the lever is provided with an outturned toe 213 which is formed to provide an upwardly and forwardly inclined cam surface 214.

The finger 212 carries an outturned toe 215 which is formed to provide an upwardly and rearwardly inclined cam surface 216 (FIG. 26).

When the slide rail 169 is moved to the right as viewed in FIG. 21, the flange 170 will enter the slot of the bearing 150 and the slot of the bearing 175 will receive the flange 146 of the rail 145. As shown most clearly in FIGS. 22 and 23, a portion of the bearing 150 is disposed in the path of the toe 215; but as the rail 169 moves toward the right from the position of FIG. 22, the inclined surface 216 of the toe 215 cams the lever upwardly so that the lower edge of said toe rides freely over the surface 217 of the bearing 150 in the manner illustrated in FIGS. 24 and 25.

FIG. 26 shows the condition of the parts just after the slide 169 has moved somewhat to the right from the position of FIG. 24 and the toe 215 has dropped off the surface 217 of the bearing 150; and it shows also the position of the parts when the drawer has been moved from its fully housed position to its forward stop position. It will be apparent that, when the parts are in the positions of FIG. 26, the drawer will be restrained against further movement to the left. It will be perceived, however, that in this position of the parts the distal end of the lever 210 projects beyond the forward slideway mouth 133 and is readily accessible for manipulation to lift the toe 215 free from stopping engagement with the bearing 150.

Figure 27:
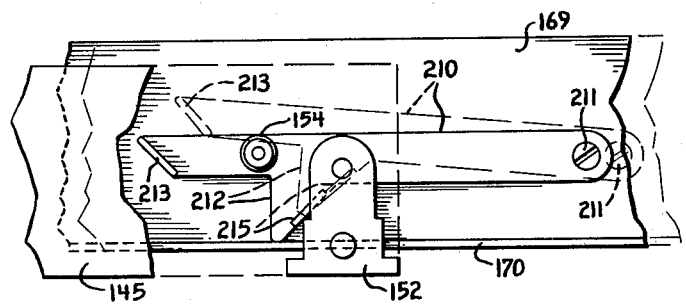
FIG. 27 is a fragmentary elevation showing the same stop lever in two successive positions which it assumes as normal withdrawal of the drawer from the opposite end of its slideway begins.
Figure 28:
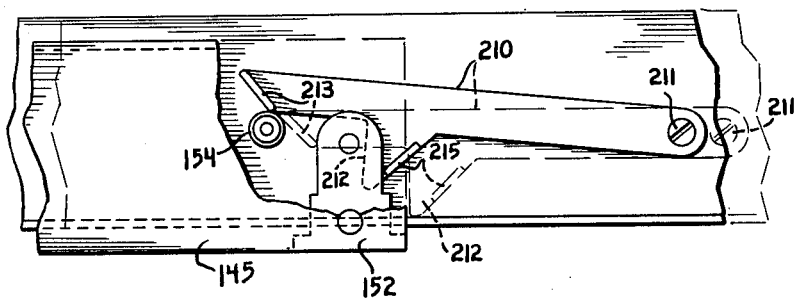
FIG. 28 is a similar view showing two successive positions assumed by the stop lever as such normal withdrawal is continued.
Figure 31:
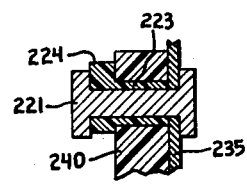
FIG. 31 is an enlarged fragmentary section taken substantially on the line 31—31 of FIG. 30.

FIG. 27 illustrates the manner in which the lever 210 will automatically ride past the bearing 152 and the post 154 at the rearward end of the slideway as the drawer is moved to the right. In solid lines, the parts are shown in the position in which the toe 215 first meets the upper portion of the bearing 152. As the drawer moves toward the right from that position, the cam surface 216 of the toe 215 will lift the lever 210 into its broken line position; and the lever will be held in that elevated position until the toe 213 attains registry with the top of the post 154. In solid lines, FIG. 28 shows the toe 213 supported upon the top of the post 154, the toe 215 having just cleared the upper surface of the bearing 152. In broken lines, FIG. 28 illustrates the next position of the parts, in which the surface 214 of the toe 213 is just leaving engagement with the post 154. From this position, the slide 169 and the drawer may move freely until the lever at the forward end of the rail 158 comes into stopping engagement with the bearing 140 at the rear end of the slideway (FIG. 13).

As will be seen from inspection of FIG. 28, the longitudinal distance between the toes 213 and 215 is substantially equal to the longitudinal distance between the abutment surface of the bearing 152 and the post 154. Thus, as the drawer is returned from its rearwardly-extended position toward its fully housed position, the inclined surface 214 of the toe 213 will engage the cylindrical surface of the post 154, as shown in broken lines in FIG. 28, just before the toe 215 would come into stopping engagement with the rearmost surface of the bearing 152; and as the drawer continues to move toward the left, the cam surface 214 will ride over the post 154, thus lifting the lever 210 to raise the toe 215 to clear the abutment surface of the bearing 152. As the lower edge of the toe 213 drops off the post 154, the lower edge of the toe 215 will rest upon the upper surface of the bearing 152 (corresponding to the surface 217 of the bearing 150), and will be supported thereon until the lower toe edge passes off that bearing surface and the cam surface 216 lowers the lever to the solid line position of FIG. 27 in which the toe 215 will pass freely under the post 154.

In FIGS. 29 and 30, I have illustrated still another form of a stop means and mounting therefor, involving a slightly modified form of rails and bearings. While I have shown this form of the invention in a two-way drawer assembly of the character illustrated in FIG. 13, it will be apparent that the bearing and stop lever structures may be incorporated in the drawer assemblies of all of the several forms of invention disclosed herein.

In FIG. 29 I have shown a frame 230 similar to the frame 130 of FIG. 13 and comprising side walls 231 and 232 secured together to define oppositely-opening mouths 233 and 234. A guide rail 235, formed with a longitudinally extending recess 220 and with an inturned flange 236 is secured to the wall 232 preferably by means of a screw 237 adjacent one end of the rail and a screw 239 passing through a vertically elongated slot 238 adjacent the other end of the rail. A bearing 240 formed to provide a slot 241 is secured to the rail 235 adjacent the rearward end thereof by means of a rivet 221 whose outer end is disposed in the rail recess 220; and a similar bearing 242 having a slot 243 therein is similarly secured to the rail 235 adjacent the forward end thereof by means of a rivet 222. As is most clearly to be seen in FIG. 30, a nylon bushing 223 is interposed between the inner surface of the bearing and the inner head of the rivet 222, and said bushing is formed with an enlarged, eccentric head 224. Because of the eccentricity of the bushing head, it will be seen that, by rotary adjustment of said bushing, the elevation of the upper most surface of the bushing head may be adjusted. It will further be seen that the bushing head projects inwardly from the plane of the inner surface of the rail 235 so that it can perform the function of the post 144 of the assembly of FIG. 13, in a manner hereinafter to be described.

A similar rail 245 having an inturned flange 246 is secured to the frame wall 232 by means of a screw 247 near the rearward end of the frame and a screw 247' passing through a slot 238' in the forward end of the rail 245. A bearing 250 having a slot 251 therein is secured to the rail 245 near the rearward end thereof by means of a rivet 226 and a bearing 252 having a slot 253 is secured to the rail near the forward end thereof by means of a rivet 227 similar to the rivet 221, a bushing 228 (FIG. 30) similar to the bushing 223 being included in the arrangement.

A drawer, indicated generally by the reference numeral 255, includes side walls 256 and 257; and a slide rail 258 having an outturned flange 259 is secured to the wall 256 by means of a screw 260 near the forward end of the rail and a screw 262 passing through a vertically elongated slot 261 near the rearward end of the rail. A bearing 263 is secured to the rail 258 by means of a rivet 229 near the rearward end thereof and a similar bearing 264 is secured to the rail by means of a rivet 265 near the forward end thereof.

A similar slide rail 266 is similarly secured to the wall 257; and a bearing 267 is secured to the rail 266 near the rearward end thereof by means of a rivet 268 while another bearing 269 is secured to the rail near the forward end thereof by means of a rivet 270.

In this form of the invention, each of the several bearings may take the form illustrated in detail in FIG. 30. As there shown, the bearing 267 is formed, near the lower edge of its rearward face, with a forward stud 271, an intermediate stud 272 and a rearward stud 273 which, in the assembled condition of the structure, will bear flatly at their distal ends against the surface of the associated rail 266. A stop lever 274 is formed, near its rearward end and in its lower surface, with a notch 275 which, as shown, receives the stud 271, whereby the lever is fulcrumed upon said stud. The distal end 276 of the lever 274 projects forwardly from the bearings a sufficient distance so that, when the drawer is fully projected through the frame mouth 233, said lever end 276 is accessible for manipulation. The tail 277 of the lever projects rearwardly sufficiently to engage the stud 272 to limit counterclockwise movement (as viewed in FIG. 29) of the lever 274 about its fulcrum.

Intermediate its ends, the lever 274 is formed with an outwardly offset section 278 which, in the assembled condition of the structure, is disposed substantially in the plane of the uppermost portion 279 of the bearing 240. Just forwardly of the offset section 278, the lever is formed with a downwardly extending toe 280, the rearward surface 281 of which is flatly vertical and the forward surface 282 of which is arcuately curved downwardly and rearwardly. At the forward end of the offset section 278, the lever is formed with a second downwardly projecting toe 283, the forward surface 284 of which is flatly vertical and the rearward surface 285 of which is downwardly and forwardly curved or inclined to define a camming surface.

It will be seen that, as the drawer is moved from a position in which it projects through the rearward mouth 234 of the frame toward a fully housed position, the camming surface 282 of the toe 280 will strike the head 224 of the bushing 223 to elevate the lever sufficiently to cause the forward surface of the toe 283 to clear the bearing portion 279, thus permitting the drawer to move freely to its fully housed position. As the drawer is moved farther to the left (as viewed in FIG. 30), and as the lever 274 approaches the bearing 242, however, the toe 280 will laterally clear the rivet 222 and the forward face 284 of the toe 283 will contact the bearing 242 to stop further movement of the drawer to the left. At this point, the distal end 276 of the lever 274 projects beyond the open mouth 233 of the frame and is accessible to be lifted manually to disengage the toe 283 from the bearing 242 and permit the drawer to be bodily removed from the frame.

As the drawer is reentered through the mouth 233 of the frame, the camming surface 285 of the toe 283 will engage the bearing 242 and will ride up over the bearing. As the drawer is moved farther to the right, the camming surface of the toe 283 will similarly engage the uppermost portion of the bearing 240 to lift the lever; and the bottom edge of the toe 280 will find support upon the head 224 of the bushing 223 just before the bottom end of the toe 283 leaves the top surface of the bearing, whereby the lever 274 will be held in elevated condition to pass the bearing-rivet-bushing assembly adjacent the frame mouth 234, freely.

A stop lever 286 is associated with the bearing 264 in the same manner in which the lever 274 is associated with the bearing 267, and cooperates with the bearings and rivets on the rail 245 in the same manner.

I claim as my invention:

1. Drawer suspension means comprising frame means providing a slideway for a drawer, said slideway having an open mouth for entry of a drawer therethrough into said slideway, a pair of guide rails mounted respectively at the lateral sides of said slideway in facing relation, each guide rail providing a flange extending toward the other, a pair of slide rails respectively mounted at opposite lateral sides of a drawer, each slide rail providing a flange extending laterally outwardly, a nylon bearing mounted at each lateral side of said slideway adjacent the mouth thereof, each bearing being formed to provide a slot elongated in the direction of length of said slideway, opening toward the other bearing and constructed and arranged slidably to receive and support the flange of one of said slide rails while the other bearing slot similarly receives and supports the flange of the other of said slide rails, and a further nylon bearing mounted at each lateral side of said drawer adjacent that end of said drawer which is adapted first to enter said slideway mouth, each such further bearing being formed to provide a slot elongated in the direction of sliding movement of said drawer, opening laterally outwardly and constructed and arranged slidably to receive and be supported by the flange of one of said guide rails while the slot of the other of said further bearings similarly receives and is supported by the flange of the other of said guide rails, and a stop device mounted to travel with said drawer and engageable with means fixed with respect to said slideway to restrain said drawer against removal from said slideway, said stop device being movable relative to said drawer to pass said fixed means, said stop device comprising a lever having one end pivotally mounted on said drawer adjacent one of said further bearings and extending therefrom toward the other end of said drawer, said lever carrying, intermediate its ends, a finger constructed and arranged normally to rest on said flange of the adjacent slide rail, said finger having a laterally-outwardly turned ear positioned, when said finger rests on said flange, to engage and be stopped by one of said first-named bearings upon substantial withdrawal of said drawer from said slideway.

2. The drawer suspension means of claim 1 in which the recited parts are so proportioned and arranged that, when said ear so engages said one bearing, the distal end of said lever is located outside the mouth of said slideway for ready manipulation.

3. The drawer suspension means of claim 1 in which said ear is formed to provide a cam surface facing the pivoted end of said lever and cooperable with said one bearing, upon insertion of said drawer through the mouth of said slideway, to swing said lever about its pivotal mounting and to pass said bearing freely.

4. Drawer suspension means comprising frame means providing a slideway for a drawer, said slideway having an open mouth for entry of a drawer therethrough into said slideway, a pair of guide rails mounted respectively at the lateral sides of said slideway in facing relation, each guide rail providing a flange extending toward the other, a pair of slide rails respectively mounted at opposite lateral sides of a drawer, each slide rail providing a flange extending laterally outwardly, a nylon bearing mounted at each lateral side of said slideway adjacent the mouth thereof, each bearing being formed to provide a slot elongated in the direction of length of said slideway, opening toward the other bearing and constructed and arranged slidably to receive and support the flange of one of said slide rails while the other bearing slot similarly receives and supports the flange of the other of said slide rails, and a further nylon bearing mounted at each lateral side of said drawer adjacent that end of said drawer which is adapted first to enter said slideway mouth, each such further bearing being formed to provide a slot elongated in the direction of sliding movement of said drawer, opening laterally outwardly and constructed and arranged slidably to receive and be supported by the flange of one of said guide rails while the slot of the other of said further bearings similarly receives and is supported by the flange of the other of said guide rails, a stop element mounted to move with one of said slide rails and extending in the direction of extension of the flange of that slide rail, and a stop element stationary with respect to the corresponding guide rail and extending in the direction of extension of the flange of that guide rail into the path of said first-named stop element, one of said stop elements being resiliently retractable toward its associated rail, and one of said stop elements being formed to provide a cam surface acting, when engaged by the other stop element, to urge retraction of said resiliently retractable element.

5. Drawer suspension means comprising frame means providing a slideway for a drawer, said slideway having an open mouth for entry of a drawer therethrough into said slideway, a pair of guide rails mounted respectively at the lateral sides of said slideway in facing relation, each guide rail providing a flange extending toward the other, a pair of slide rails respectively mounted at opposite lateral sides of a drawer, each slide rail being supported for limited longitudinal movement relative to said drawer and each slide rail providing a flange extending laterally outwardly, a nylon bearing mounted at each lateral side of said slideway adjacent the mouth thereof, each bearing being formed to provide a slot elongated in the direction of length of said slideway, opening toward the other bearing and constructed and arranged slidably to receive and support the flange of one of said slide rails while the other bearing slot similarly receives and supports the flange of the other of said slide rails, a further nylon bearing fixedly secured to each slide rail adjacent that end of the slide rail which is adapted first to enter said slideway mouth, each such further bearing being formed to provide a slot elongated in the direction of sliding movement of said drawer, opening laterally outwardly and constructed and arranged slidably to receive and be supported by the flange of one of said guide rails while the slot of the other of said further bearings similarly receives and is supported by the flange of the other of said guide rails, a stop element located adjacent said further bearing to travel with one of said slide rails, and a stop element mounted on the corresponding guide rail and normally disposed in the travel path of said first-named stop element, one of said stop elements being manipulatable relative to its associated rail to evade the other and having a portion which is accessible for manipulation when said drawer is fully extended.

6. The drawer suspension means of claim 5 in which each slide rail is formed with longitudinally extending slot means, two nylon bushings for each slide rail, each such bushing having a stem portion snugly received in said slot means and having an axial extent not greater than the thickness of said rail and each bushing further having a head portion with a diameter exceeding the width of said slot means, mounting means penetrating each of said bushings and said slot means and engaging said drawer and said bushing to press said bushing head portion against said slide rail, and washer means having a width greater than the width of said slot means, penetrated by each of said mounting means and disposed between said drawer and said slide rail.

7. The drawer suspension means of claim 6 in which said washer means is formed of nylon, and a spring washer penetrated by each of said mounting means and disposed between said drawer and said slide rail.

8. Drawer suspension means comprising frame means providing a slideway open at its opposite ends for reception of a drawer, a pair of guide rails mounted respectively at the lateral sides of said slideway in facing relation, each guide rail providing a flange extending toward the other, a pair of slide rails respectively mounted at opposite lateral sides of a drawer, each slide rail providing a flange extending laterally outwardly, a nylon bearing mounted at each lateral side of said slideway adjacent each open end thereof, each bearing being formed to provide a slot elongated in the direction of length of said slideway and opening toward the other bearing at the same end of said slideway, the slots in both bearings at each side of said slideway being disposed substantially in a common plane and being constructed and arranged slidably to receive and support the flange of one of said slide rails while the slots in the bearings at the other side of said slideway similarly receive and support the flange of the other of said slide rails, and a further nylon bearing mounted at each lateral side of said drawer adjacent each end of said drawer, each such further bearing being formed to provide a slot elongated in the direction of sliding movement of said drawer and opening laterally outwardly, the slots in both further bearings at each side of said drawer being disposed substantially in a common plane and being constructed and arranged slidably to receive and be supported by the flange of one of said guide rails while the slots in the further bearings at the other side of said drawer similarly receive and are supported by the flange of the other of said guide rails.

9. The drawer suspension means of claim 8 including a stop member fixed with respect to said slideway at one side of said slideway and adjacent one open end of said slideway, a second stop member fixed with respect to said slideway at the other side of said slideway and adjacent the other open end of said slideway, a stop element mounted adjacent one end of said drawer and at one side of said drawer to travel with said drawer, said stop element being positioned to engage said first-named stop member to limit extension of the other end of said drawer outwardly beyond said one end of said slideway, and a second stop element mounted adjacent the other end of said drawer and at the other side of said drawer to travel with said drawer, said second stop element being positioned to engage said second stop member to limit extension of said one end of said drawer outwardly beyond said other end of said slideway.

10. The drawer suspension means of claim 9 in which one piece of each cooperating stop member-stop element pair is manipulatable, and is accessible for manipulation when in such limiting engagement, to release such engagement and permit complete withdrawal of said drawer from said slideway.

11. The drawer suspension means of claim 9 in which each stop element is a lever pivotally mounted at one end on its associated slide rail and extending therefrom toward the opposite end of said drawer, each lever being provided, intermediate its ends, with a downwardly-extending finger normally supported on the flange of its associated slide rail and with an out-turned ear inclined downwardly and toward said opposite end of said drawer, and in which each stop member is a fixed post located near the bearing adjacent the corresponding end of said slideway but more remote from said slideway end and projecting into the path of said ear.

12. The drawer suspension means of claim 11 in which each lever is so proportioned and arranged that, when its ear engages the corresponding stop post, its distal end projects beyond the end of said slideway for readily accessible manipulation.

13. Drawer suspension means comprising frame means providing a slideway open at its front end and open at its rear end for reception of a drawer, a pair of guide rails mounted respectively at the lateral sides of said slideway in facing relation, each guide rail providing a flange projecting toward the other and extending substantially from end to end of said slideway, a pair of slide rails respectively mounted at opposite lateral sides of a drawer which has a front end and a rear end, the length of said drawer from end to end being substantially equal to the length of said slideway from end to end, each slide rail providing a flange projecting laterally outwardly and extending substantially from end to end of said drawer, a bearing mounted at each lateral side of said slideway adjacent each open end thereof, each bearing being formed to provide a slot elongated in the direction of length of said slideway and opening toward the other bearing at the same end of said slideway, the slots in both bearings at each side of said slideway being disposed substantially in a common plane and being constructed and arranged slidably to receive and support the flange of one of said slide rails while the slots in the bearings at the opposite side of said slideway similarly receive and support the flange of the other of said slide rails, a further bearing mounted at each lateral side of said drawer adjacent each end of said drawer, each such further bearing being formed to provide a slot elongated in the direction of sliding movement of said drawer and opening laterally outwardly, the slots in both further bearings at each side of said drawer being disposed substantially in a common plane and being constructed and arranged slidably to receive and be supported by the flange of one of said guide rails while the slots in the further bearings at the other side of said drawer similarly receive and are supported by the flange of the other of said guide rails, a first stop lever pivotally mounted at its proximal end adjacent the rear end of said drawer at one side thereof with its distal end extending toward the front end of said drawer, said lever carrying, near its distal end, a first out-turned ear providing an upwardly and forwardly inclined cam surface, said lever further carrying intermediate its ends a downwardly-extending finger normally supported upon the flange of the associated slide rail and said lever further carrying intermediate its ends a second out-turned ear providing an upwardly and rearwardly inclined cam surface, said second ear being disposed at a level below that of said first ear, said bearing at the front end of said slideway and on the side thereof corresponding to said one side of said drawer having a portion disposed in the forward-moving path of said second ear when said finger is so supported, and an abutment post fixedly supported near the rear end of said slideway and at the same side thereof and disposed in the forward-moving path of said first-named ear when said finger is so supported, said post being spaced forwardly from the rearward end of the bearing at the rear end of said slideway by a distance substantially equal to the longitudinal distance between said ears, a second stop lever pivotally mounted at its proximal end adjacent the forward end of said drawer at the other side thereof with its distal end extending toward the rear end of said drawer, said second lever carrying, near its distal end, a third out-turned ear providing an upwardly and rearwardly inclined cam surface, said second lever further carrying intermediate its ends a downwardly-extending finger normally supported upon the flange of the associated slide rail and said second lever further carrying intermediate its ends a fourth out-turned ear providing an upwardly and forwardly inclined cam surface, said fourth ear being disposed at a level below that of said third ear, said bearing at the rear end of said slideway and on the side thereof corresponding to said other side of said drawer having a portion disposed in the rearward-moving path of said fourth ear when said last-named finger is so supported, and a second abutment post fixedly supported near the forward end of said slideway and at the last-named side thereof and disposed in the rearward-moving path of said third ear when said last-named finger is so supported, said second post being spaced rearwardly from the forward end of the bearing at the front end of said slideway by a distance substantially equal to the longitudinal distance between said third and fourth ears.

14. Drawer suspension means comprising frame means providing a slideway open at its opposite ends for reception of a drawer, a pair of guide rails mounted respectively at the lateral sides of said slideway in facing relation, each guide rail providing a flange extending toward the other, a pair of slide rails respectively mounted at opposite lateral sides of a drawer, each slide rail providing a flange extending laterally outwardly, a nylon bearing mounted at each lateral side of said slideway adjacent each open end thereof, each bearing being formed to provide a slot elongated in the direction of length of said slideway and opening toward the other bearing at the same end of said slideway, the slots in both bearings at each side of said slideway being disposed substantially in a common plane and being constructed and arranged slidably to receive and support the flange of one of said slide rails while the slots in the bearings at the other side of said slideway similarly receive and support the flange of the other of said slide rails, a further nylon bearing mounted at each lateral side of said drawer adjacent each end of said drawer, each such further bearing being formed to provide a slot elongated in the direction of sliding movement of said drawer and opening laterally outwardly, the slots in both further bearings at each side of said drawer being disposed substantially in a common plane and being constructed and arranged slidably to receive and be supported by the flange of one of said guide rails while the slots in the further bearings at the other side of said drawer similarly receive and are supported by the flange of the other of said guide rails, a stop member fixed with respect to said slideway at one side of said slideway and adjacent one open end of said slideway, a second stop member fixed with respect to said slideway at the other side of said slideway and adjacent the other open end of said slideway, a stop element mounted adjacent one end of said drawer and at one side of said drawer to travel with said drawer, said stop element being positioned to engage said first-named stop member to limit extension of the other end of said drawer outwardly beyond said one end of said slideway, and a second stop element mounted adjacent the other end of said drawer and at the other side of said drawer to travel with said drawer, said second stop element being positioned to engage said second stop member to limit extension of said one end of said drawer outwardly beyond said other end of said slideway, each such stop element being a lever pivotally mounted adjacent one end on an axis moving with its associated slide rail and extending therefrom toward the opposite end of said drawer, each lever being provided, intermediate its ends, with an outwardly-offset section, a first toe projecting downwardly from said offset section closely adjacent that end of said section which is more remote from said axis, said toe having a camming surface facing said axis and a flat surface facing away from said axis, a second toe projecting downwardly from said lever at a point more remote from said axis than said offset section, said second toe having a camming surface facing away from said axis and a flat surface facing said axis, each stop member comprising an element disposed in the path of said second toe of its associated lever and each bearing on the corresponding side of said slideway having a portion disposed in the path of said first toe of its associated lever.

15. Drawer suspension means comprising frame means providing a slideway for a drawer, said slideway having an open mouth for entry of a drawer therethrough into said slideway, a pair of guide rails mounted respectively at the lateral sides of said slideway in facing relation, said guide rails being mounted at corresponding ends upon aligned, fixed pivots with their opposite corresponding ends being adjustable about the common axis of said pivots, each guide rail providing a flange extending toward the other, a pair of slide rails respectively mounted at opposite lateral sides of a drawer, said slide rails being mounted, at corresponding ends remote from said fixed pivots, upon aligned pivots fixed with respect to said drawer with their opposite corresponding ends being adjustable about the common axis of said pivots which are fixed with respect to said drawer, each slide rail providing a flange extending laterally outwardly, a nylon bearing mounted at each lateral side of said slideway adjacent the mouth thereof, each bearing being formed to provide a slot elongated in the direction of length of said slideway, opening toward the other bearing and constructed and arranged slidably to receive and support the flange of one of said slide rails while the other bearing slot similarly receives and supports the flange of the other of said slide rails, and a further nylon bearing mounted at each lateral side of said drawer adjacent that end of said drawer which is adapted first to enter said slideway mouth, each such further bearing being formed to provide a slot elongated in the direction of sliding movement of said drawer, opening laterally outwardly and constructed and arranged slidably to receive and be supported by the flange of one of said guide rails while the slot of the other of said further bearings similarly receives and is supported by the flange of the other of said guide rails.

16. Drawer suspension means comprising frame means providing a slideway open at its opposite ends for reception of a drawer, a pair of guide rails mounted respectively at the lateral sides of said slideway in facing relation, each gide rail providing a flange extending toward the other, a pair of slide rails respectively mounted at opposite lateral sides of a drawer, each slide rail providing a flange extending laterally outwardly, a bearing mounted at each lateral side of said slideway adjacent each open end thereof and arranged slidably to support the flanges of said slide rails, a further bearing mounted at each lateral side of said drawer adjacent each end of said drawer and arranged to be slidably supported on the flanges of said guide rails, a stop member fixed with respect to said slideway at one side of said slideway and adjacent one open end of said slideway, a second stop member fixed with respect to said slideway at the other side of said slideway and adjacent the other open end of said slideway, a stop element mounted adjacent one end of said drawer and at one side of said drawer to travel with said drawer, said stop element being positioned to engage said first named stop member to limit extension of the other end of said drawer outwardly beyond said one end of said slideway, and a second stop element mounted adjacent the other end of said drawer and at the other side of said drawer to travel with said drawer, said second stop element being positioned to engage said second stop member to limit extension of said one end of said drawer outwardly beyond said other end of said slideway, each such stop element being a lever pivotally mounted adjacent one end on an axis moving with its associated slide rail and extending therefrom toward the opposite end of said drawer, each lever being provided, intermediate its ends, with an outwardly-offset section, a first toe projecting downwardly from said offset section closely adjacent that end of said section which is more remote from said axis, said toe having a camming surface facing said axis and a flat surface facing away from said axis, a second toe projecting downwardly from said lever at a point more remote from said axis than said offset section, said second toe having a camming surface facing away from said axis and a flat surface facing said axis, each stop member comprising an element disposed in the path of said second toe of its associated lever and each bearing on the corresponding side of said slideway having a portion disposed in the path of said first toe of its associated lever.

17. Drawer suspension means comprising frame means providing a slideway open at its opposite ends for reception of a drawer, a pair of slide rails respectively mounted at opposite lateral sides of a drawer, each slide rail providing a flange extending laterally outwardly, a bearing mounted at each lateral side of said slideway adjacent each open end thereof and arranged slidably to support the flanges of said slide rails, a stop member fixed with respect to said slideway at one side of said slideway and adjacent one open end of said slideway, a second stop member fixed with respect to said slideway at the other side of said slideway and adjacent the other open end of said slideway, a stop element mounted adjacent one end of said drawer and at one side of said drawer to travel with said drawer, said stop element being positioned to engage said first-named stop member to limit extension of the other end of said drawer outwardly beyond said one end of said slideway, and a second stop element mounted adjacent the other end of said drawer and at the other side of said drawer to travel with said drawer, said second stop element being positioned to engage said second stop member to limit extension of said one end of said drawer outwardly beyond said other end of said slideway, each such stop element being a lever pivotally mounted adjacent one end on an axis moving with its associated slide rail and extending therefrom toward the opposite end of said drawer, each lever being provided, intermediate its ends, with an outwardly-offset section, a first toe projecting downwardly from said offset section closely adjacent that end of said section which is more remote from said axis, said toe having a camming surface facing said axis and a flat surface facing away from said axis, a second toe projecting downwardly from said lever at a point more remote from said axis than said offset section, said second toe having a camming surface facing away from said axis and a flat surface facing said axis, each stop member comprising an element disposed in the path of said second toe of its associated lever and each bearing on the corresponding side of said slideway having a portion disposed in the path of said first toe of its associated lever.

References Cited in the file of this patent

UNITED STATES PATENTS

| | | |
|---|---|---|
| 1,002,902 | Cossey | Sept. 12, 1911 |
| 2,550,980 | Drake | May 1, 1951 |
| 2,646,333 | Abrahamson | July 21, 1953 |
| 2,751,272 | Hutzelman | June 19, 1956 |

FOREIGN PATENTS

| | | |
|---|---|---|
| 1,169,951 | France | Jan. 8, 1959 |